A. W. BROWNE.
Improvement in Ellipsographs.
No. 126,782. Patented May 14, 1872.
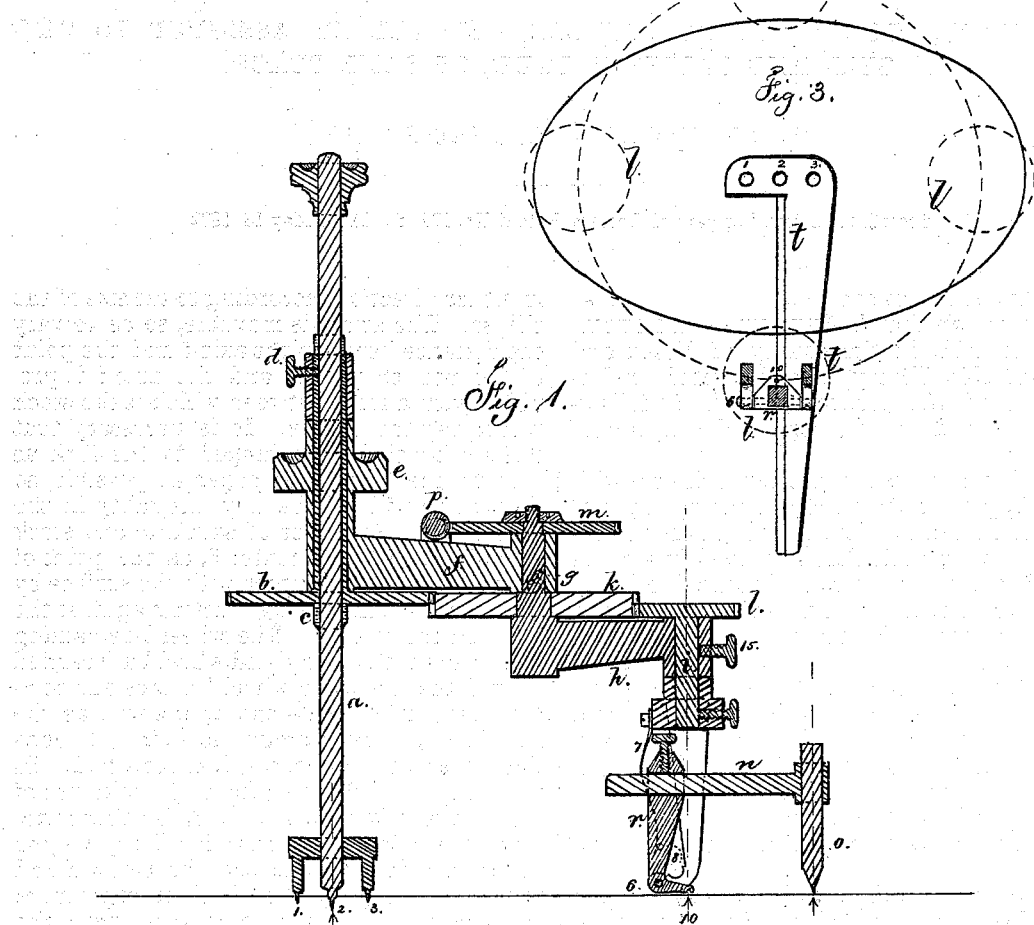
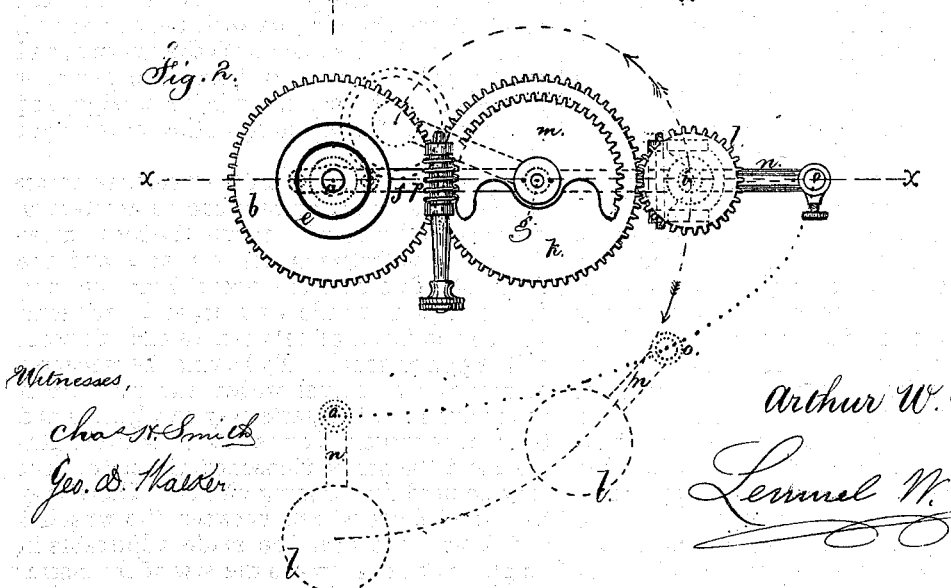
Witnesses
Chas. H. Smith
Geo. D. Walker
Inventor
Arthur W. Browne
Lemuel W. Serrell
atty.

UNITED STATES PATENT OFFICE.

ARTHUR W. BROWNE, OF BLOOMFIELD, NEW JERSEY, ASSIGNOR TO HIMSELF AND CALVIN P. LADD, OF SAME PLACE.

IMPROVEMENT IN ELLIPSOGRAPHS.

Specification forming part of Letters Patent No. 126,782, dated May 14, 1872.

*To all whom it may concern:*

Be it known that I, ARTHUR W. BROWNE, of Bloomfield, in the county of Essex and State of New Jersey, have invented an Improvement in Ellipsographs; and the following is declared to be a correct description of the same.

This invention is for describing ellipses with a pencil, pen, or other instrument, upon paper or other material. The improvement relates to a revolving shaft that is moved in a circle around a fixed center, and rotated once in each revolution, and the pencil or pen is at the end of an arm projecting from the shaft that describes the ellipse or oval, in consequence of being toward the fixed center during two of the quarter portions of the revolution, and away from the fixed center in the other two quarter portions of the revolution, and according to the length of arm carrying the pen, so there will be greater or less difference between the transverse and conjugate diameters of the ellipse.

In the drawing, Figure 1 is a vertical section of the instrument complete. Fig. 2 is a plan of the same; and Fig. 3 is a diagram, illustrating the positions of the parts.

The central standard $a$ is made with three centering-points, 1 2 3, that steady the instrument and prevent the standard revolving. $b$ is a gear-wheel upon a sleeve, $c$, that can be turned upon $a$ and held either by spring-friction or by a set-screw, $d$. Around the sleeve $c$ or standard $a$ is a sleeve and thumb-wheel, $e$, and from the sleeve an arm, $f$, projects and carries, at its end, the axis $g$ and arm $h$. Around the axis $g$ is the wheel $k$, which may be of the same size and number of teeth as the wheel $b$; and this gears into the third wheel $l$ having half the number of teeth of the wheel $b$, and being upon the axis $i$. The axis $i$ passes through the arm $h$ and carries the arm $n$ and pen or pencil $o$. The axis $g$ is confined in the arm $f$, either by a spring or clamp, so that it can be turned around more or less into any desired position, and so remain while in use; or the sector $m$ and worm-pinion $p$ may be used for the same purpose; the object in either instance being to bring the center of $i$ nearer to or further from the center of $a$ within the extremes of movement in either direction, according to the size of the ellipse. The arm $n$ is movable, so as to vary the distance between the axis $i$ and the point of the pen or pencil; and the axis $i$ is provided with a fork, between which is the stock $r$, carrying the arm $n$. It is necessary that this stock $r$ should be hinged to the fork as near to the surface of paper as possible, so that there will not be any inequality in the ellipse, in consequence of said arm and stock swinging upon such center 6, as the point of the pen is kept in contact with the surface by pressure from the spring 7 acting against the pin 8 on the stock $r$. The wheel $b$ remaining stationary as the arm $f$ and wheel $k$ are carried around the same, the wheel $l$ makes one complete revolution on its axis $i$; (as well as the axis $i$ being carried around in a circle;) hence the ellipse will be described, as aforesaid. In order to adjust the instrument I make use of the gauge $t$ with holes 1 2 3, for the corresponding points of $a$, and this I apply upon the said points and loosen the screw $d$ and turn the axis $g$ by the wheel or segment $m$ and screw-pinion $p$, or otherwise, until the point 10, which is in line with the center of $i$, is the required distance from the center 2, and in line with the edge of $t$, and the pencil or pen-point is also in line with that edge, and at the required position from the center point 10.

The rule for determining the measurements is as follows: Add the long and short diameters together and divide by four, and the result gives the distance between the center 2 and the point 10. Subtract the short from the long diameter and divide by four, and the result will be the distance between 10 and the point of the pen or pencil. By having the measures of any oval or ellipse within the compass of the instrument, the parts may be adjusted and the ellipse struck. If the set-screw 15 is tightened and the screw $d$ loosened, the instrument may be used for striking circles. There may be intermediate wheels between the wheels $b$ and $k$, and the arm $f$ be made adjustable in length, so as to increase the size of the instrument.

I claim as my invention—

1. The arm $h$, swinging on the axis $g$ and carrying the shaft $i$ and pencil or pen, in combination with the wheels $b\ k\ l$ and standard $a$, substantially as set forth.

2. The arm $n$, for the pencil or pen, mounted upon the stock $r$, that is united to the fork by a joint near the surface of the paper, in combination with the axis $i$ and spring 7, as and for the purposes set forth.

Signed by me this 21st day of February, A. D. 1872.

ARTHUR W. BROWNE.

Witnesses:
A. G. SAYER,
BENJN. EASTWOOD.